United States Patent
Åstrand

(10) Patent No.: US 9,462,052 B2
(45) Date of Patent: Oct. 4, 2016

(54) INPUT HANDOVER FROM A FIRST DEVICE TO A SECOND DEVICE

(71) Applicant: Sony Corporation, Tokyo (JP)

(72) Inventor: Per Åstrand, Lund (SE)

(73) Assignees: Sony Corporation, Tokyo (JP); Sony Mobile Communications Inc., Tokyo (JP)

(*) Notice: Subject to any disclaimer, the term of this patent is extended or adjusted under 35 U.S.C. 154(b) by 299 days.

(21) Appl. No.: 14/303,544

(22) Filed: Jun. 12, 2014

(65) Prior Publication Data

US 2015/0365472 A1 Dec. 17, 2015

(51) Int. Cl.

| G06F 15/16 | (2006.01) |
| H04L 29/08 | (2006.01) |
| G06F 3/048 | (2013.01) |
| G06K 9/00 | (2006.01) |
| H04L 12/58 | (2006.01) |
| G06F 3/0488 | (2013.01) |
| G06F 3/14 | (2006.01) |
| G06F 3/038 | (2013.01) |
| G06F 3/0354 | (2013.01) |

(52) U.S. Cl.
CPC ............ H04L 67/104 (2013.01); G06F 3/038 (2013.01); G06F 3/03543 (2013.01); G06F 3/048 (2013.01); G06F 3/0488 (2013.01); G06F 3/1423 (2013.01); G06K 9/00624 (2013.01); H04L 51/20 (2013.01); H04L 51/36 (2013.01); H04L 51/38 (2013.01); H04L 67/06 (2013.01); H04L 67/141 (2013.01); H04L 67/18 (2013.01); *G06F 2203/0381* (2013.01); *G09G 2356/00* (2013.01)

(58) Field of Classification Search
None
See application file for complete search history.

(56) References Cited

U.S. PATENT DOCUMENTS

| 5,293,635 | A * | 3/1994 | Faulk, Jr. ............ H04L 12/4625 370/255 |
| 8,230,075 | B1 * | 7/2012 | Weskamp ............. H04W 4/023 709/203 |
| 9,285,928 | B2 * | 3/2016 | Hsieh ..................... G06F 3/0421 |
| 2003/0026499 | A1 * | 2/2003 | Stewart ................ G01R 31/021 382/291 |
| 2005/0007408 | A1 * | 1/2005 | Hin ........................ B41J 19/205 347/19 |
| 2007/0279237 | A1 * | 12/2007 | Julian ................... G01S 5/0284 340/686.1 |
| 2009/0091710 | A1 * | 4/2009 | Huebner ................ G03B 21/14 353/28 |
| 2010/0240021 | A1 * | 9/2010 | Berndt ..................... G01N 1/30 435/3 |

(Continued)

FOREIGN PATENT DOCUMENTS

| EP | 1954053 A1 | 8/2008 |
| EP | 2728446 A2 | 5/2014 |

OTHER PUBLICATIONS

International Search Report and Written Opinion; Feb. 20, 2015; issued in International Patent Application No. PCT/EP2014/077557.

*Primary Examiner* — Brian P Whipple
(74) *Attorney, Agent, or Firm* — James C. Edwards; Moore & Van Allen PLLC

(57) ABSTRACT

The invention is directed to input handover from a first device to a second device. An exemplary method comprises: establishing a connection between a first device and a second device; capturing a first image from the first device; capturing a second image from the second device; determining a location of the second device in reference to the first device based on comparing the first image and the second image; determining occurrence of a trigger event on the first device; and executing handover of an input instruction from the first device to the second device.

16 Claims, 2 Drawing Sheets

(56) References Cited

U.S. PATENT DOCUMENTS

2010/0250136 A1 9/2010 Chen
2012/0235926 A1 9/2012 Sip
2013/0286238 A1* 10/2013 Tan .................... H04N 5/77
                                                348/222.1
2014/0247346 A1* 9/2014 Bozarth .............. H04W 4/023
                                                348/143

* cited by examiner

INPUT HANDOVER FROM A FIRST DEVICE TO A SECOND DEVICE

BACKGROUND

A user may use a first device (e.g., a personal computer) in conjunction with a second device (e.g., a mobile phone) while working on the same application (e.g., a word processing application). For example, the user may draft a portion of a document on a first device, and may then switch to drafting the remaining portion of the document on the second device. While switching from the first device to the second device, the user may need to make several manual adjustments on the second device in order to continue working on the same application. There is a need for seamless switching from a first device to a second device.

BRIEF SUMMARY

Embodiments of the invention are directed to a system, method, and computer program product for input handover from a first device to a second device. An exemplary method comprises: establishing a connection between a first device and a second device; capturing a first image from the first device; capturing a second image from the second device; determining a location of the second device in reference to the first device based on comparing the first image and the second image; determining occurrence of a trigger event on the first device; and executing handover of an input instruction from the first device to the second device.

In some embodiments, determining a location of the second device in reference to the first device comprises determining whether the second device is located near a first edge of the first device or a second edge of the first device.

In some embodiments, the trigger event comprises an interaction with a first edge or a second edge of the first device.

In some embodiments, the method further comprises mapping or matching a point associated with the first image with a point associated with the second image.

In some embodiments, the first image and the second image are captured substantially simultaneously.

In some embodiments, determining the location of the second device in reference to the first device further comprises mapping a movement of a point associated with the first image with a movement of a point associated with the second image.

In some embodiments, executing handover of an input instruction from the first device to the second device comprises sending a notification to the second device to start receiving an input instruction from the first device.

In some embodiments, the handover uses a network protocol.

In some embodiments, the first device comprises a device that accepts input via a mouse or a keyboard.

In some embodiments, the second device comprises a device that accepts touch input.

In some embodiments, the input instruction is entered on the first device, and the method further comprises transferring the input instruction from the first device to the second device.

In some embodiments, the second device can be controlled via input entered on the second device.

In some embodiments, the method further comprises transferring data from the first device to the second device using input provided on at least one of the first device or the second device.

In some embodiments, a system is provided for input handover from a first device to a second device. The system comprises a memory; a processor; a module stored in the memory, executable by the processor, and configured to: establish a connection between a first device and a second device; receive a first image from the first device; receive a second image from the second device; determine a location of the second device in reference to the first device based on comparing the first image and the second image; determine occurrence of a trigger event on the first device; and execute handover of an input instruction from the first device to the second device.

In some embodiments, the system comprises a cloud-based server.

In some embodiments, a computer program product is provided for input handover from a first device to a second device. The computer program product comprising a non-transitory computer-readable medium comprising code configured to: establish a connection between a first device and a second device; receive a first image from the first device; receive a second image from the second device; determine a location of the second device in reference to the first device based on comparing the first image and the second image; determine occurrence of a trigger event on the first device; and execute handover of an input instruction from the first device to the second device.

BRIEF DESCRIPTION OF THE DRAWINGS

Figure 1:
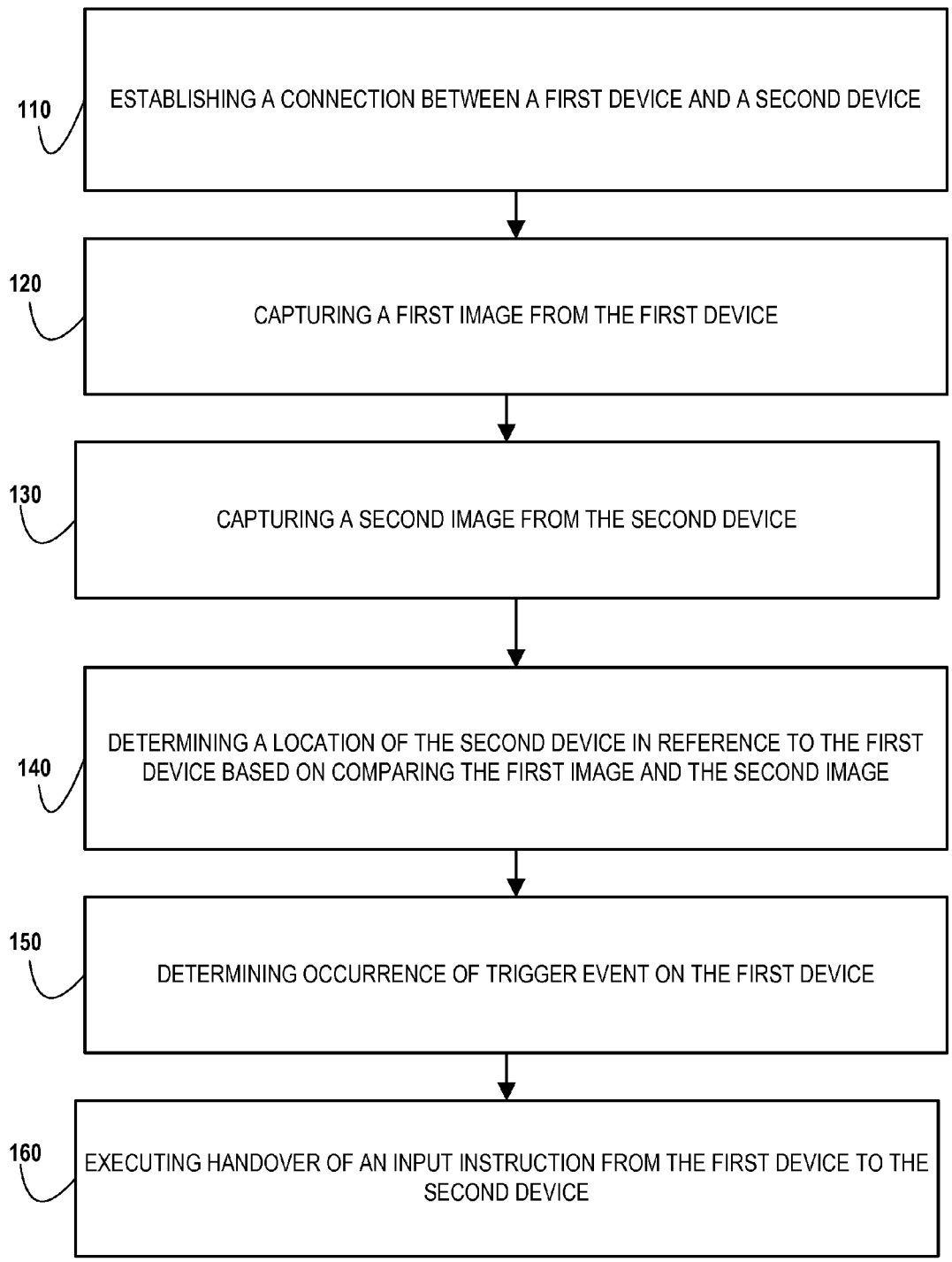
Figure 2:
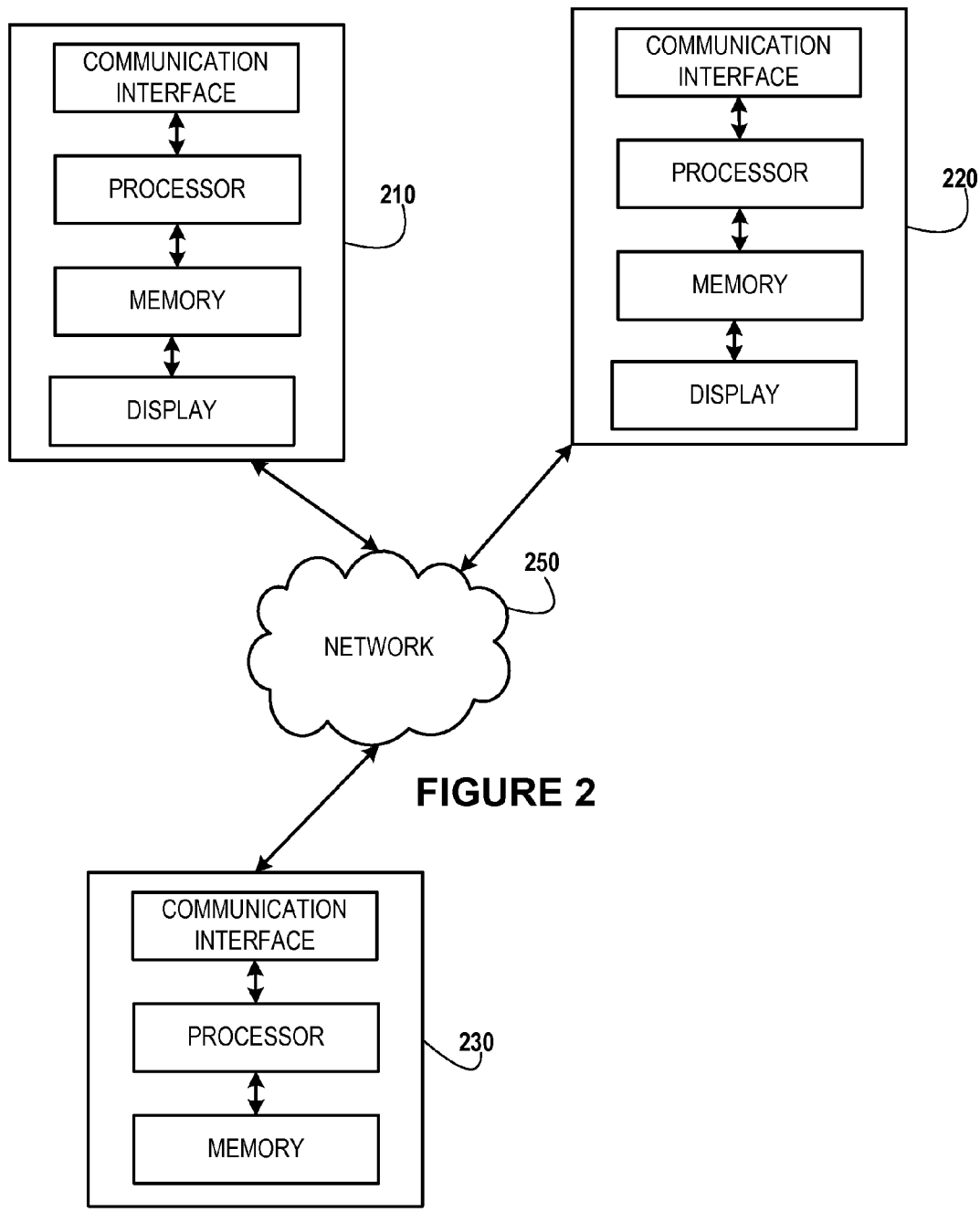

Having thus described embodiments of the invention in general terms, reference will now be made to the accompanying drawings, where:

FIG. 1 presents an exemplary process flow for input handover from a first device to a second device, in accordance with embodiments of the present invention; and FIG. 2 presents an exemplary network environment for input handover from a first device to a second device, in accordance with embodiments of the present invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

The present invention is directed to enabling a user to seamlessly switch from a first device to a second device while working on an application. In some embodiments, the present invention uses network protocol (e.g., Internet Protocol) to transfer input (e.g., mouse and/or keyboard input) associated with a first device to a second device that uses touch input. For example, when a user interacts with the area ("trigger area") of a display less than or equal to a predetermined distance from a particular edge of the display of the first device, the second device receives a notification to start accepting input events for the same application that is currently being executed on the first device. As used herein, an interaction refers to the movement or presence of the mouse pointer in trigger area. The user does not have to click or double click in the trigger area. The notification may be transmitted from the first device to the second device, or from a cloud-based server that is in network communication with both the first device and the second device. Therefore, the present invention enables a user to interact with a user interface on the second device using input from the first device or the second device. The input from the first device and the second device may be also be used to simultaneously control or manipulate information on the user interface of the second device. A server application may run on the first device, wherein the server application provides or enables the various functions described herein. A client application may run on the second device, wherein the client application enables execution of the various functions described herein.

In some embodiments, the first device receives user input via a keyboard and/or a mouse or any other input device. Therefore, in some embodiments, the first device comprises at least one of a processing unit, a display (which may be separate from the processing unit or coupled to the processing unit), a keyboard, and a mouse. In some embodiments, the second device receives touch input via a display touchscreen associated with the second device. Therefore, the second device can be controlled via input from the keyboard and/or mouse associated with the first device. Also, the second device can be controlled via touch input received via the second device's display touchscreen.

The present invention also enables determination of an approximate location of the second device with reference to the first device (or to the display of the first device if the display is separate from the processing unit of the first device). As used herein, the first device or the second device may refer to a display of the first device or display of the second device. For example, the present invention enables determination of whether the second device is closer to a first edge (or a first corner) of the first device or a second edge (or a second corner) of the first device. The first edge and the second edge may be opposite edges of a device. In alternate embodiments, the first edge and the second edge may be adjacent edges of a device. In some embodiments, the present invention may also enable determination of a distance between a point (e.g., along an edge or on the surface) associated with the second device and a point (e.g., along an edge or on the surface) associated with the first device.

According to embodiments of this invention, when a user interacts with a first edge of the first device (or a display of the first device), the second device receives notification to start receiving an input instruction from the first device. However, if the second device is placed near the second edge of the first device when the interaction with the first edge of the first device occurs, the second device does not receive notification to start receiving an input instruction from the first device. An interaction associated with an edge of a device may refer to movement of a cursor along the edge of the device. Therefore, the edge of the first device may be used as a gateway to continue working on the same application on the second device.

Both the first device and second device may comprise one or more image-capturing devices (e.g., cameras). A camera on a device may capture, e.g., periodically, an image from the device. The image may be processed at the device or may be transmitted to a server where the image is processed. The image from the first device and the second device may be captured substantially simultaneously or synchronously. The images may be processed using one or more image-capturing methods in order to determine how points on the image from the first device correlate or map to the points on the image from the second device. The correlation or mapping of these images is used to determine the location of the second device in reference to the first device.

In some embodiments, the user may transfer files from the first device to the second device, or back to the first device from the second device. For example, the user may drag a file from a user interface of the first device and drop it on the user interface of the second device. Alternatively, the user may select a copy function for a file on a first device. Then the user may use the method described herein to move to the user interface of the second device, and then may select a paste function on the second device by inputting instructions from the first device or the second device. If the instructions are input on the first device, the instructions are transferred to the second device using the various methods described herein. As used herein, a file may refer to any type of data (e.g., text, images, audiovisual data, etc.)

Referring now to FIG. 1, FIG. 1 illustrates an exemplary process flow for input handover from a first device to a second device. The process flow may be performed, either singly or in combination, by a server such as a cloud-based server or any other devices or systems described herein such as the first device and/or the second device. At step 110, the process flow comprises establishing a connection between a first device and a second device. At step 120, the process flow comprises capturing a first image from the first device. At step 130, the process flow comprises capturing a second image from the second device. The first image and the second image are captured substantially simultaneously.

At step 140, the process flow comprises determining a location of the second device in reference to the first device based on comparing the first image and the second image. Determining a location of the second device in reference to the first device comprises determining whether the second device is located near a first edge of the first device or a second edge of the first device. Additionally or alternatively, determining the location of the second device in reference to the first device further comprises mapping a movement of a point associated with the first image with a movement of a point associated with the second image. Comparing the first image and the second image further comprises mapping or matching a point associated with the first image with a point associated with the second image.

At step 150, the process flow comprises determining occurrence of a trigger event on the first device. The trigger event comprises an interaction with a first edge or a second edge of the first device. At step 160, the process flow comprises executing handover of an input instruction from the first device to the second device. Executing handover of an input instruction from the first device to the second device comprises sending a notification to the second device to start receiving an input instruction from the first device.

Input handover comprises transferring an input instruction entered on the first device to the second device. The transfer may be done directly from the first device to the second device, or via the server described herein. In such embodiments, the first device transmits the input instruction to the server, and the server transmits the input instruction to the second device.

In some embodiments, the first device comprises a desktop computer, a laptop computer, or any other computing device that accepts mouse and/or keyboard input, and the second device comprises a mobile phone, tablet computer, or any other computing device that accepts touch input. However in alternate embodiments, the devices described herein, including the first device and the second device, may comprise mobile computing devices, mobile televisions, laptop computers, smart screens, tablet computers or tablets, portable desktop computers, e-readers, scanners, portable media devices, gaming devices, cameras or other image-capturing devices, headgear, eyewear, watches, bands (e.g., wristbands) or other wearable devices, servers, routers, sensors, Internet of Things (IOTs), non-computing devices or systems, etc. Additionally, the server described herein may also take the form of any devices described herein.

Referring now to FIG. 2, FIG. 2 presents an exemplary block diagram of the network environment for input handover from a first device to a second device. As illustrated, the network environment includes a network 250, a first device 210, a second device 220, and a server 230 (e.g., a cloud-based server). In some embodiments, the server 230 may be integrated into the first device 210. As shown in FIG. 2, the first device 210 and the second device 220 are operatively and selectively connected (e.g., via one or more wireless mechanisms) either directly to the network 250 or indirectly to the network 250 via one or more other computing devices, wherein the network may include one or more separate networks. Network 250 may enable the first device 210 or the second device 220 to transmit information to and/or receive information from the server 230.

The first device 210, the second device 220, or the server 230 is a computing device that comprises a communication interface, a processor, a memory, and a module stored in the memory, executable by the processor, and configured to perform the various processes described herein. Additionally, the first device 210 and the second device 220 comprise a display. Each communication interface described herein enables communication with other systems via the network 250.

Each processor described herein generally includes circuitry for implementing audio, visual, and/or logic functions. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory.

Each memory may include any computer-readable medium. For example, memory may include volatile memory, such as volatile random access memory (RAM) having a cache area for the temporary storage of information. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

In accordance with embodiments of the invention, the term "module" with respect to a system (or a device) may refer to a hardware component of the system, a software component of the system, or a component of the system that includes both hardware and software. As used herein, a module may include one or more modules, where each module may reside in separate pieces of hardware or software.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A method for input handover from a first device to a second device, the method comprising:
   establishing a connection between a first device and a second device;
   capturing a first image from the first device;
   capturing a second image from the second device;
   determining a location of the second device in reference to the first device based on comparing the first image and the second image;
   determining occurrence of a trigger event on the first device; and
   executing handover of an input instruction from the first device to the second device.

2. The method of claim 1, wherein determining a location of the second device in reference to the first device comprises determining whether the second device is located near a first edge of the first device or a second edge of the first device.

3. The method of claim 1, wherein the trigger event comprises an interaction with a first edge or a second edge of the first device.

4. The method of claim 1, further comprising mapping or matching a point associated with the first image with a point associated with the second image.

5. The method of claim 1, wherein the first image and the second image are captured substantially simultaneously.

6. The method of claim 1, wherein determining a location of the second device in reference to the first device comprises mapping a movement of a point associated with the first image with a movement of a point associated with the second image.

7. The method of claim 1, wherein executing handover of an input instruction from the first device to the second device comprises sending a notification to the second device to start receiving an input instruction from the first device.

8. The method of claim 1, wherein the handover uses a network protocol.

9. The method of claim 1, wherein the first device comprises a device that accepts input via a mouse or a keyboard.

10. The method of claim 1, wherein the second device comprises a device that accepts touch input.

11. The method of claim 1, wherein the input instruction is entered on the first device, and wherein the method further comprises transferring the input instruction from the first device to the second device.

12. The method of claim 1, wherein the second device can be controlled via input entered on the second device.

13. The method of claim 1, further comprising transferring data from the first device to the second device using input provided on at least one of the first device or the second device.

14. A system for input handover from a first device to a second device, the system comprising:
   a memory;
   a processor;
   a module stored in the memory, executable by the processor, and configured to:
      establish a connection between a first device and a second device;
      receive a first image from the first device;
      receive a second image from the second device;
      determine a location of the second device in reference to the first device based on comparing the first image and the second image;
      determine occurrence of a trigger event on the first device; and
      execute handover of an input instruction from the first device to the second device.

15. The system of claim 14, wherein the system comprises a cloud-based server.

16. A computer program product for input handover from a first device to a second device, the computer program product comprising a non-transitory computer-readable medium comprising code configured to:
    establish a connection between a first device and a second device;
    receive a first image from the first device;
    receive a second image from the second device;
    determine a location of the second device in reference to the first device based on comparing the first image and the second image;
    determine occurrence of a trigger event on the first device; and
    execute handover of an input instruction from the first device to the second device.

\* \* \* \* \*